US008977127B2

United States Patent
Luo et al.

(10) Patent No.: US 8,977,127 B2
(45) Date of Patent: Mar. 10, 2015

(54) INTER-OPTICAL LINE TERMINAL (OLT) COMMUNICATION IN MULTIPLE-OLT PASSIVE OPTICAL NETWORKS (PONS)

(71) Applicant: Futurewei Technologies, Inc., Plano, TX (US)

(72) Inventors: Yuanqiu Luo, Cranbury, NJ (US); Bo Gao, Wuhan (CN); Frank Effenberger, Colts Neck, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 118 days.

(21) Appl. No.: 13/729,676

(22) Filed: Dec. 28, 2012

(65) Prior Publication Data
US 2014/0050479 A1 Feb. 20, 2014

Related U.S. Application Data (60) Provisional application No. 61/683,531, filed on Aug. 15, 2012.

(51) Int. Cl.
*H04J 14/00* (2006.01)
*H04J 14/02* (2006.01)

(52) U.S. Cl.
CPC .............. *H04J 14/02* (2013.01); *H04J 14/023* (2013.01)
USPC ................................. 398/68; 398/69; 398/17

(58) Field of Classification Search
CPC ...... H04J 14/02; H04J 14/023; H04J 14/0257
USPC ............................. 398/17, 68, 69
See application file for complete search history.

(56) References Cited

U.S. PATENT DOCUMENTS 8,374,504 B2 * 2/2013 Mizutani et al. ................. 398/71
8,509,613 B2 * 8/2013 Chung et al. .................... 398/17
8,712,241 B2 * 4/2014 Xu et al. ......................... 398/67

(Continued)

FOREIGN PATENT DOCUMENTS

CN 101562480 A 10/2009
WO 2009035202 A1 3/2009

OTHER PUBLICATIONS

Foreign Communication From a Counterpart Application, PCT Application No. PCT/US2013/054931, International Search Report dated Oct. 31, 2013, 16 pages.

(Continued)

*Primary Examiner* — Ken Vanderpuye
*Assistant Examiner* — Amritbir Sandhu
(74) *Attorney, Agent, or Firm* — Conley Rose, P.C.; Grant Rodolph; Jonathan K. Polk (57) ABSTRACT

A system comprising a first optical line terminal (OLT) comprising a first integrated optical network unit (ONU), and a first OLT transceiver, and a second OLT coupled to the first OLT, wherein the second OLT comprises a second integrated ONU, and a second OLT transceiver. Included is a first OLT comprising an optical transceiver, at least one processor coupled to the optical transceiver, wherein the processor working in conjunction with the optical transceiver is configured to determine an upstream wavelength corresponding to a second OLT, join, via a first ONU in the first OLT, the second OLT using the upstream wavelength corresponding to the second OLT, and transmit data to the second OLT by the first OLT via the first ONU, wherein the second OLT comprises a second ONU.

23 Claims, 8 Drawing Sheets

(56) References Cited

U.S. PATENT DOCUMENTS

| | | | |
|---|---|---|---|
| 8,761,611 B2* | 6/2014 | Luo | 398/168 |
| 2008/0138072 A1* | 6/2008 | Sakamoto et al. | 398/68 |
| 2008/0175588 A1* | 7/2008 | Bernard et al. | 398/17 |
| 2009/0010643 A1* | 1/2009 | DeLew et al. | 398/17 |
| 2009/0060496 A1* | 3/2009 | Liu et al. | 398/17 |
| 2009/0060507 A1* | 3/2009 | Effenberger et al. | 398/60 |
| 2009/0162063 A1* | 6/2009 | Mizutani et al. | 398/58 |
| 2009/0202246 A1* | 8/2009 | Kashima | 398/77 |
| 2009/0285576 A1* | 11/2009 | Noel et al. | 398/17 |
| 2010/0074614 A1* | 3/2010 | DeLew et al. | 398/17 |
| 2010/0322626 A1* | 12/2010 | Kim et al. | 398/63 |
| 2011/0280568 A1* | 11/2011 | Dvir et al. | 398/13 |
| 2012/0093513 A1* | 4/2012 | Luo et al. | 398/66 |
| 2012/0141139 A1* | 6/2012 | Bakhru et al. | 398/158 |
| 2012/0269515 A1* | 10/2012 | Cvijetic et al. | 398/72 |
| 2013/0034356 A1* | 2/2013 | Luo et al. | 398/72 |
| 2013/0183039 A1* | 7/2013 | Hood et al. | 398/72 |
| 2014/0050479 A1* | 2/2014 | Luo et al. | 398/68 |
| 2014/0161461 A1* | 6/2014 | Lee et al. | 398/79 |
| 2014/0219611 A1* | 8/2014 | Sasaki et al. | 385/59 |

OTHER PUBLICATIONS

Foreign Communication From a Counterpart Application, PCT Application No. PCT/US2013/054931, Written Opinion dated Oct. 31, 2013, 8 pages.

* cited by examiner

INTER-OPTICAL LINE TERMINAL (OLT) COMMUNICATION IN MULTIPLE-OLT PASSIVE OPTICAL NETWORKS (PONS)

CROSS-REFERENCE TO RELATED APPLICATIONS

The present application claims the benefit of U.S. Provisional Patent Application No. 61/683,531 filed Aug. 15, 2012 by Yuanqiu Luo, et al. and entitled "Inter Optical Network Terminal (OLT) Communication in Multiple-OLT Passive Optical Networks (PONs)," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point-to-multi-point (P2MP) network comprised of an optical line terminal (OLT) at the central office, an optical distribution network (ODN), and a plurality of optical network units (ONUs) at the customer premises. Ethernet passive optical network (EPON) is a PON standard developed by the Institute of Electrical and Electronics Engineers (IEEE) and specified in IEEE 802.3ah, which is incorporated herein by reference as if reproduced in its entirety. In EPON, a single fiber can be used for both the upstream and the downstream transmission with different wavelengths. The OLT implements an EPON Media Access Control (MAC) layer for transmission of Ethernet Frames. The Multi-Point Control Protocol (MPCP) performs the bandwidth assignment, bandwidth polling, auto-discovery, and ranging. Ethernet frames are broadcast downstream based on the Logical Link Identifier (LLID) embedded in the preamble frame. Upstream bandwidth is assigned based on the exchange of Gate and Report messages between an OLT and an ONU.

In addition to EPON, other protocols may be implemented in a PON. Examples of such protocols include the asynchronous transfer mode (ATM) PON (APON) and the broadband PON (BPON) defined by the International Telecommunications Union (ITU) Telecommunication Standardization Sector (ITU-T) G.983 standard, Gigabit PON (GPON) defined by the ITU-T G.984 standard, and the wavelength division multiplexing (WDM) PON (WDM-PON).

With an increasing need for open access, PON systems comprising multiple OLTs are appearing. A multi-OLT PON can enable a plurality of service providers to share infrastructure. However, a multi-OLT PON system presents complications in the coordination and control of the various OLTs. Consequently, there is a need in the art for methods and apparatus for inter-OLT communication and control.

SUMMARY

In an embodiment, the disclosure includes a system comprising a first OLT comprising a first integrated ONU, and a first OLT transceiver, and a second OLT coupled to the first OLT, wherein the second OLT comprises a second integrated ONU, and a second OLT transceiver.

In another embodiment, the disclosure includes a first OLT comprising an optical transceiver, at least one processor coupled to the optical transceiver, wherein the processor working in conjunction with the optical transceiver is configured to determine an upstream wavelength corresponding to a second OLT, join, via a first ONU in the first OLT, the second OLT using the upstream wavelength corresponding to the second OLT, and transmit data to the second OLT by the first OLT via the first ONU, wherein the second OLT comprises a second ONU.

In another embodiment, the disclosure includes a method for mitigating inter-OLT interference comprising detecting interference in a transmission on a PON, wherein the detecting comprises not receiving expected frames by a first OLT when the interference is on a upstream wavelength on the PON, and wherein the detecting comprises incorrectly receiving downstream frames by an ONU in the first OLT when the interference is on a downstream wavelength on the PON, and transmitting a message to the second OLT informing the second OLT of an interfering transmission, wherein the second OLT is the cause of the interference.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

An inter-OLT communication mechanism is proposed. The inter-OLT communication mechanism can be used to detect and notify of rogue OLT impairment in a PON system with multiple OLTs. The integrated ONU in an OLT receives complaint signals from other OLTs. The integrated ONU may send rogue OLT mitigation information to the integrated ONU's OLT via the well known and well defined PON management and control channels.

Figure 1:
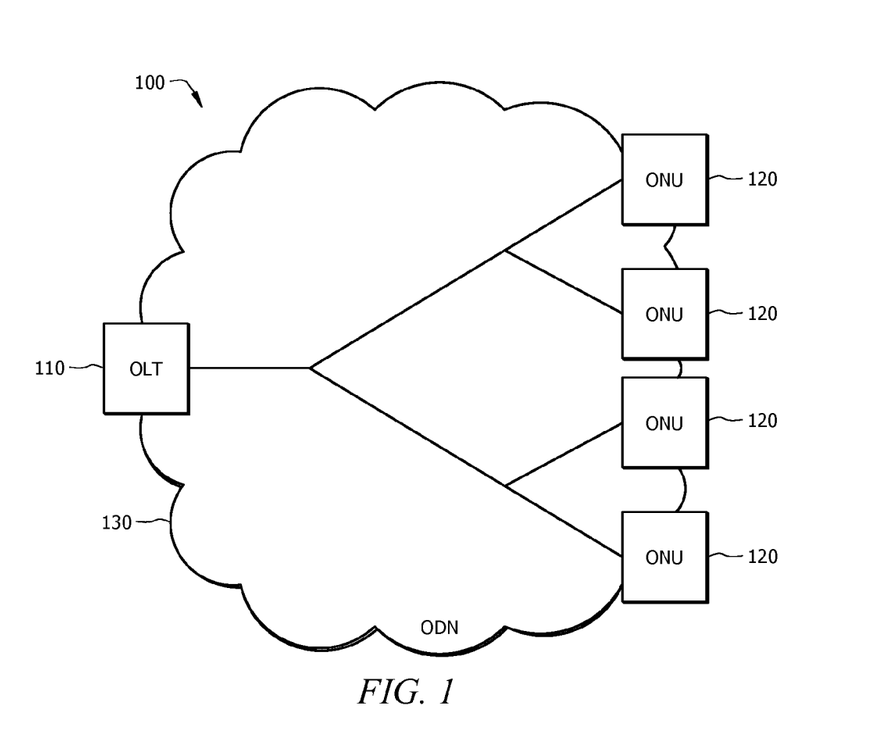
FIG. 1 is a block diagram of a PON in accordance with an embodiment of the disclosure.

FIG. 1 illustrates one embodiment of a PON 100 according to an embodiment of the disclosure. The PON 100 may comprise an OLT 110, a plurality of ONUs 120, and an ODN 130. The PON 100 is a communications network that does not require any active components to distribute data between the OLT 110 and the ONUs 120. Instead, the PON 100 uses the passive optical components in the ODN 130 to distribute data between the OLT 110 and the ONUs 120. Examples of suitable PONs 100 include the APON and the BPON defined by the International Telecommunication Union Telecommunication Standardization Sector (ITU-T) G.983 standard, the GPON defined by the ITU-T G.984 standard, the EPON defined by the IEEE 802.3ah standard, and the WDM PON, all of which are incorporated by reference as if reproduced in their entirety.

The OLT 110 may be any device that is configured to communicate with the ONUs 120 and another network (not shown). Specifically, the OLT 110 may act as an intermediary between the other network and the ONUs 120. For instance, the OLT 110 may forward data received from the network to the ONUs 120, and forward data received from the ONUs 120 onto the other network. Although the specific configuration of the OLT 110 may vary depending on the type of PON 100, in an embodiment the OLT 110 may comprise a transmitter and a receiver. When the other network is using a protocol, such as Ethernet or Synchronous Optical Networking/Synchronous Digital Hierarchy (SONET/SDH), that is different from the communications protocol used in the PON 100, the OLT 110 may comprise a converter that converts the other network's data into the PON's protocol. The converter may also convert the PON's data into the other network's protocol. The OLT 110 described herein is typically located at a central location, such as a central office, but may be located at other locations as well.

The ODN 130 is a data distribution system that may comprise optical fiber cables, couplers, splitters, distributors, and/or other equipment. In an embodiment, the optical fiber cables, couplers, splitters, distributors, and/or other equipment are passive optical components. Specifically, the optical fiber cables, couplers, splitters, distributors, and/or other equipment may be components that do not require any power to distribute data signals between the OLT 110 and the ONUs 120. It should be noted that the optical fiber cables may be replaced by any optical transmission media in some embodiments. In some embodiments, the ODN 130 may comprise one or more optical amplifiers. The ODN 130 typically extends from the OLT 110 to the ONUs 120 in a branching configuration as shown in FIG. 1, but may be alternatively configured as determined by a person of ordinary skill in the art.

The ONUs 120 may be any device that is configured to communicate with the OLT 110 and a customer or user (not shown). Specifically, the ONUs 120 may act as an intermediary between the OLT 110 and the customer. For instance, the ONUs 120 may forward data received from the OLT 110 to the customer, and forward data received from the customer onto the OLT 110. Although the specific configuration of the ONUs 120 may vary depending on the type of PON 100, in an embodiment the ONUs 120 may comprise an optical transmitter configured to send optical signals to the OLT 110. Additionally, the ONUs 120 may comprise an optical receiver configured to receive optical signals from the OLT 110 and a converter that converts the optical signal into electrical signals for the customer, such as signals in the ATM or Ethernet protocol. The ONUs 120 may also comprise a second transmitter and/or receiver that may send and/or receive the electrical signals to a customer device. In some embodiments, ONUs 120 and optical network terminals (ONTs) are similar, and thus the terms are used interchangeably herein. The ONUs 120 are typically located at distributed locations, such as the customer premises, but may be located at other locations as well.

Figure 2:
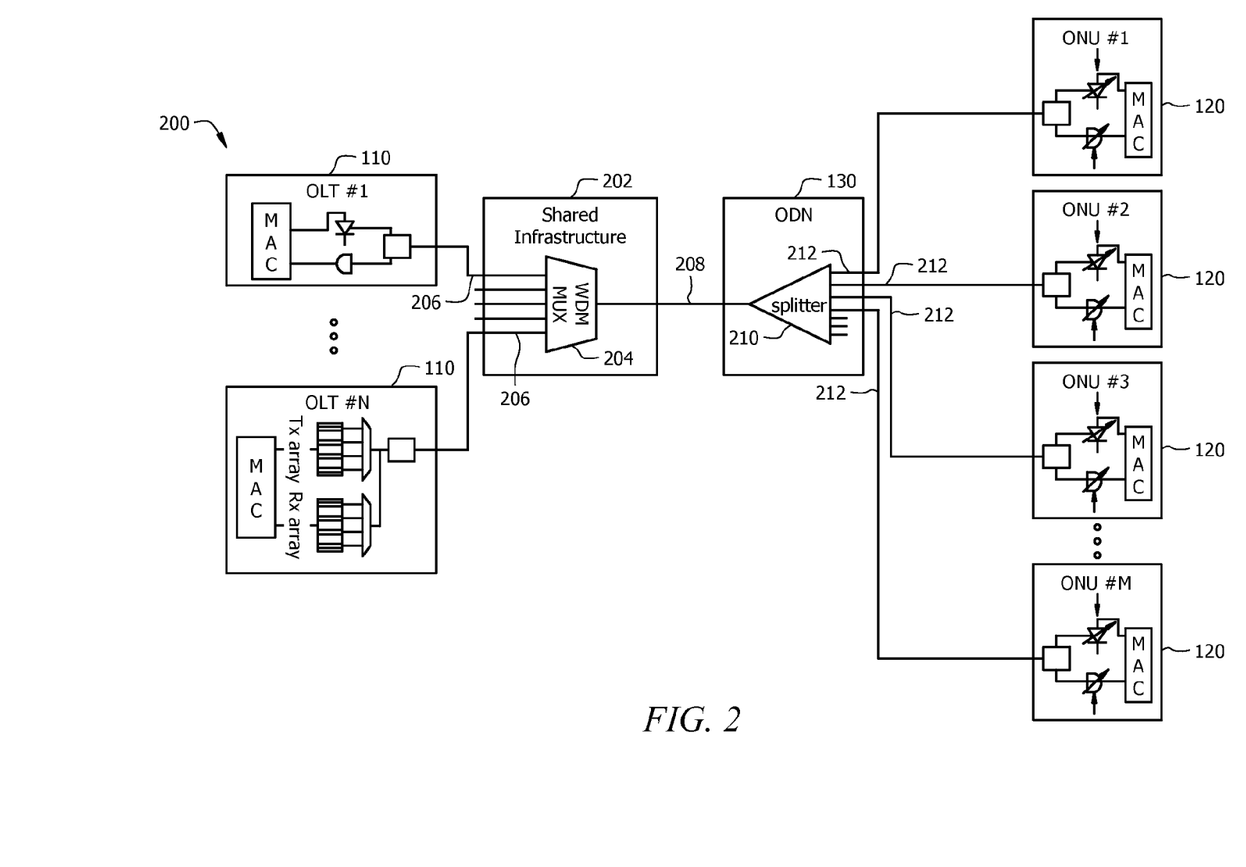
FIG. 2 is a block diagram of a multi-OLT PON system in accordance with an embodiment of the disclosure.

Refer now to FIG. 2 illustrating a multiple OLT PON system 200 which may be used in conjunction with embodiments of the disclosure. PON system 200 includes a plurality of OLTs 110, here numbered 1, . . . , N. The OLTs 110 are coupled to ODN 130 via a shared infrastructure 202 which may comprise a wavelength division multiplexing (WDM) multiplexer (MUX) 204. As described in additional detail below, each OLT 110 may operate on a different optical wavelength for downstream transmission of data (i.e. toward ONUs 120) and upstream reception of data (i.e. from ONUs 120). Also, the wavelengths for downstream transmission of data and upstream reception of data may be different across the OLTs 110, as will be further described below. Each OLT 110 is coupled to a respective port of WDM MUX 204 via separate fibers 206, and the WDM MUX 204 multiplexes optical signals from the fibers 206 onto a single optical fiber 208. ODN 130 may include a splitter 210 that copies the signal on optical fiber 208 and fans the copied signals out to respective ONUs 120 (labeled 1, . . . , M) via fibers 212. Note that splitter 210 and WDM MUX 204 may be bidirectional, serving to combine upstream signals from each of ONUs 120 onto optical fiber 208 and fanning out the upstream signals to corresponding ones of OLTs 110.

Figure 3:
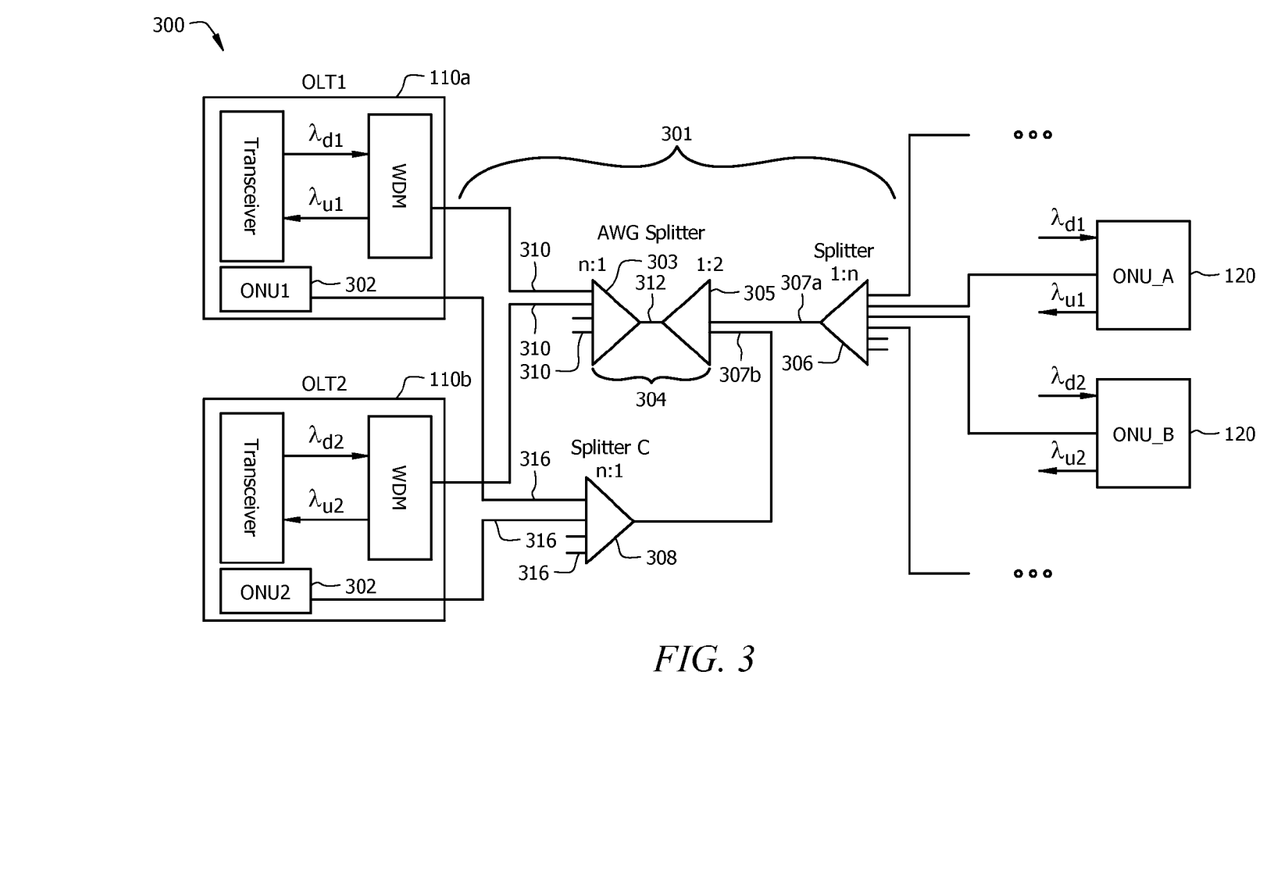
FIG. 3 is a block diagram of a multi-OLT PON system, in accordance with another embodiment of the disclosure.

Refer now to FIG. 3, which illustrates a block diagram of a PON 300 in accordance with an embodiment of the disclosure. PON 300 includes OLTs 110a and 110b. Each OLT 110 may comprise an integrated ONU 302. In the embodiment of FIG. 3, two OLTs 110 are shown, however, it would be understood by those skilled in the art that the principles disclosed herein are not limited to two OLTs and can apply to a PON system including any number of OLTs 110.

Each integrated ONU 302 may be able to tune to any downstream wavelength and any upstream wavelength. PON 300 may include an arrayed waveguide grating (AWG) based ODN 301. Specifically, PON 300 further comprises splitter 304, splitter 306 and splitter 308. Splitter 304 may include an n:1 portion 303 and a 1:2 portion 305. Here "n:1" is used to denote a many-to-one relationship between ports 310 and 312 of portion 303 of splitter 304. Thus, as would be recognized by those skilled in the art, in the downstream direction the fan in of a number N of OLTs 110 implies that the number, n, of ports 310 may be larger than or equal to N. As shown, portion 303 may comprise an AWG. However, as described further in conjunction with FIG. 4, a PON in accordance with other embodiments of the disclosure may use other implementations of a splitter.

In the downstream direction of FIG. 3, an OLT signal passes through a plurality of splitters. Splitter 304 divides the signal input to 1:2 portion 305 into two parts. One part is fed into splitter 306 via fiber 307a of 1:2 portion 305, and the other part fed into splitter 308 via fiber 307b. The signal feeding splitters 306 and 308 need not be of equal power. For example, 99% of the signal input into 1:2 portion 305 may be fed into splitter 306 and the remaining 1% into splitter 308. Splitter 306 connects all ONUs 120, which may be deployed at subscriber sites, and fans out the signals to corresponding ones of ONUs 120. In FIG. 3, two ONUs 120 are shown; however, it would be understood by those skilled in the art, that the principles disclosed herein are not limited to two ONUs 120 and that any number may be included in embodiments of the disclosure. Splitter 306 may comprise a 1:n splitter, where the splitter 308 loops the downstream signal back to the integrated ONUs 302. As described above, "1:n" is used to denote a one-to-many relationship, between fibers 307b and 316 of splitter 308. Thus, as would be recognized by those skilled in the art, with respect to the looped-back signal, the fan out of a number N of ONUs 302 implies that the number, n, of fibers 316 may be larger than or equal to N.

In the upstream direction, signals from the ONUs 120 and signals from ONUs 302 (via splitter 306 and splitter 308, respectively) are combined and then separated using splitter 304 before reaching the OLTs 110. The upstream process is basically the reverse of the above-described downstream process. In addition, it will be appreciated that any of the fibers described herein could be optical waveguides or free-space optical signals.

Each OLT 110 may communicate on different optical wavelengths for upstream and downstream traffic. Thus, for example, OLT 110a (OLT1) is shown sending downstream communication on a wavelength $\lambda_{d1}$ and receiving upstream communication a wavelength $\lambda_{u1}$. Further, the wavelengths used by each OLT 110 may be different for each of the OLTs 110. Thus, for example, OLT 110b (OLT2) is shown sending downstream communication on a wavelength $\lambda_{d2}$ and receiving upstream communication on a wavelength $\lambda_{u2}$. The application of the wavelength differentiation among OLTs 110 will be described further below.

OLTs 110 may communicate with each other via their respective ONUs 302. For example, the ONU 302 in OLT1 (ONU1) may find the upstream wavelength that corresponds to OLT2. This may be done by correlating a broadcast bandwidth map with OLT2. OLTs in a PON system such as OLTs 110 in PON system 300 may broadcast a bandwidth map to network units on the PON, such as ONUs 120 and ONUs 302. The broadcast bandwidth may include the operating wavelengths (upstream and downstream) assigned to the respective OLT 110. Once ONU1 finds the wavelengths of OLT2, ONU1 may join OLT2 by using the wavelength of OLT2. Upon ONU1 joining OLT2, OLT1 may communicate with OLT2. This mechanism is described further in conjunction with FIG. 7A below.

In another example in accordance with the disclosed embodiments, an integrated ONU 302, say ONU2 in OLT2 may serve as a communication proxy for its OLT, OLT2 in this example. Thus, OLT1 sends its message to OLT2 in the OLT1 downstream wavelength ($\lambda_{d1}$ as depicted in FIG. 3). ONU2 may be equipped with a tunable receiver and may scan all downstream wavelengths. ONU2 may thereby receive a message from OLT1. ONU2 may forward the message to OLT2. This mechanism is described further in conjunction with FIG. 7B below.

In yet another example in accordance the disclosed embodiments, inter-OLT communication may be through an out of band management channel, which also may simply be referred to hereinafter as a management channel. If a management channel is provided, each OLT 110 and its respective ONU 302 may be able to transmit and receive signals via the management channel. When OLT1 for example needs to communicate with OLT2, ONU1 may send out a notification to OLT2 in the management channel.

Although the examples described may refer to a particular one of OLTs 110 communicating with another particular OLT 110, the inter-OLT communication via the integrated ONUs 302 in accordance with the disclosed embodiments is peer-to-peer. That is each OLT 110 is a peer to all other OLTs 110 and each can communicate with any of the others on an equal footing.

Figure 4:
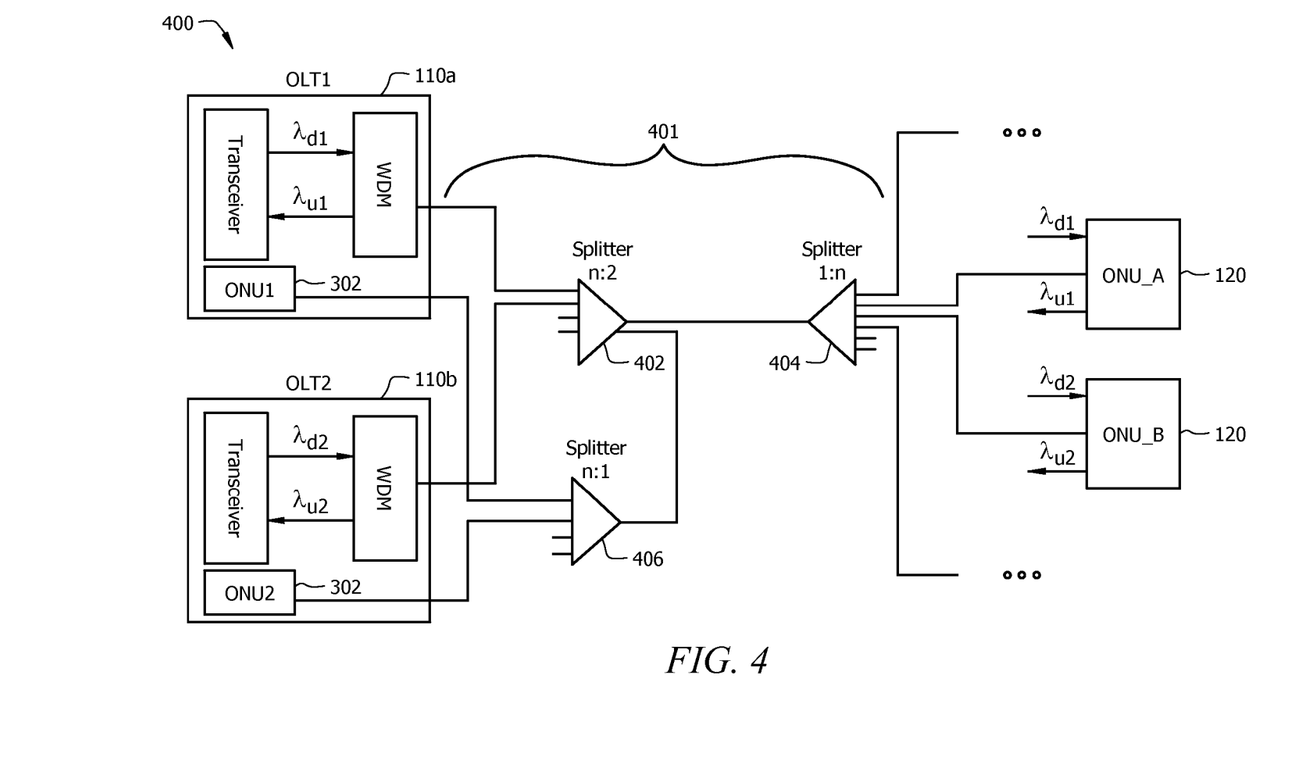
FIG. 4 is a block diagram of a multi-OLT PON system in accordance with yet another embodiment of the disclosure.

Refer now to FIG. 4, which illustrates a block diagram of a PON system 400 in accordance with another embodiment of the disclosure. PON system 400, which may comprise a splitter-based ODN 401, includes splitters 402, 404, and 406. Splitter 402 may be an n:2 device, splitter 404 may be a 1:n device, and splitter 406 may be an n:1 device. It will be readily understood by those skilled in the art that the inter-OLT communication examples described in conjunction with PON system 300 in FIG. 3 would also be applicable to PON system 400 and operate in the same way. In particular, downstream signals from OLT2, on wavelength $\lambda_{d2}$ may be looped back to the corresponding integrated ONU 302, ONU2, via splitters 402 and 406.

In a multi-OLT PON system, such as those illustrated in FIGS. 2-4, a misconfigured or otherwise malfunctioning OLT may cause contamination in either or both upstream and downstream communications. For example, such an OLT may erroneously issue a command to ask its associated ONU to communicate on an incorrect upstream wavelength. This can cause interference in the affected wavelength, and the transmissions on that wavelength from other ONUs that properly communicate on that wavelength cannot be correctly detected by an OLT properly operating on the affected upstream wavelength. Such upstream contamination will be further described in conjunction with FIG. 5. Similarly, if an OLT's transmitter operates on an incorrect wavelength, its transmission interferes with another OLT which properly uses the affected downstream wavelength, say $\lambda_{d1}$, and that wavelength channel is contaminated. Such downstream contamination may occur in a splitter-based ODN (e.g., ODN 401 in FIG. 4). In AWG-based ODNs (e.g. ODN 301 in FIG. 3), the AWG blocks an interfering downstream signal. Downstream contamination will be further described in conjunction with FIG. 6.

Figure 5:
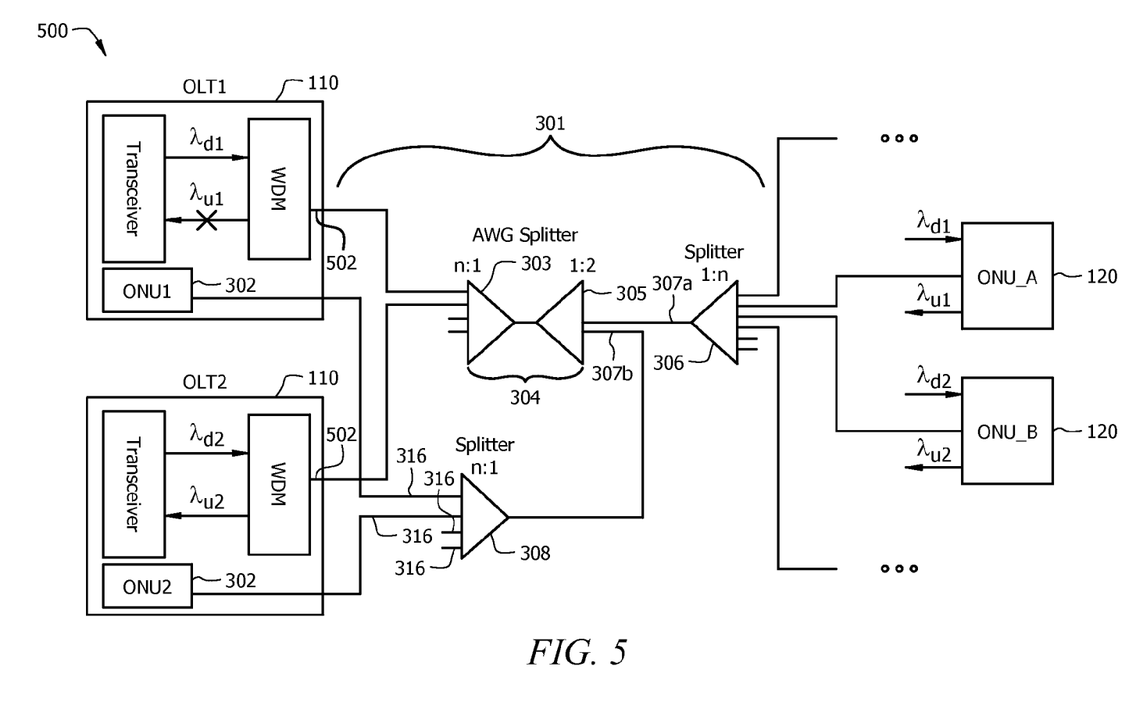
FIG. 5 is a block diagram of a multi-OLT PON system in accordance with an embodiment of the disclosure in which the system is subject to upstream interference.

Refer now to FIG. 5, which illustrates a block diagram of a PON system 500 subject to upstream contamination. In this example, OLT2 has commanded its corresponding ONU 120 (labeled ONU_B) to communicate on the upstream wavelength assigned to OLT1 (labeled $\lambda_{u1}$). This can cause interference with the upstream transmission in $\lambda_{u1}$. Contaminated signals are depicted in FIG. 5 with an "X" through them. OLT1 may detect this erroneous behavior because no expected bursts or frames can be correctly received by it on upstream wavelength $\lambda_{u1}$.

In response, the victim OLT (OLT1) may inform the malfunctioning OLT (OLT2) of the erroneous operation. OLT1 may use a plurality of mechanisms to communicate with OLT2 in accordance with the principles of the disclosed embodiments. In one example, the ONU 302 in the victim OLT (ONU1) may determine the downstream wavelength that corresponds to the interfering ONU 120 (ONU_B). ONU1 may correlate the broadcast bandwidth map with the interference, and thereby determine the offending OLT (OLT2). The victim OLT (OLT1) may send a message to the malfunctioning OLT (OLT2) via the malfunctioning OLT's integrated ONU 302 (ONU2), e.g. by using an out of band management channel, thereby informing OLT 1 that it is operating on an incorrect wavelength.

In another example in accordance with the embodiments of the disclosure, when the ONU 302 (ONU1) in the victim OLT 110 (OLT1) determines the downstream wavelength of the interfering ONU 120 (ONU_B), ONU1 may join the offending OLT 110 (e.g. via ODN port 502 of OLT2) by using the appropriate wavelength, here $\lambda_{u2}$. The ODN port may be the optical port or connection between an OLT and the ODN and carries both upstream and downstream traffic to and from the OLT. An integrated ONU such as ONU1 may join the OLT using the same protocol as a downstream ONU such as an ONU 120. As understood by those skilled in the art, the protocol may depend on the type of PON. For example, in an EPON, ONUs may join an OLT via the exchange of MPCP GATE and REGISTER messages, and in a GPON by exchange of Physical Layer Operations and Maintenance (PLOAM) messages. After joining OLT2, ONU1 may send a communication to OLT2 informing it of its improper operation.

In yet another example mechanism, the victim OLT 110 (OLT1) may notify OLT2 of the improper operation by sending a warning message in the OLT1 downstream wavelength (i.e., $\lambda_{d1}$). An ONU 302 (ONU2) in the offending OLT 110 (OLT2) equipped with a tunable receiver and which scans all downstream wavelengths may receive the warning message from OLT1. ONU2 may report this to OLT2, allowing OLT2 to mitigate the problem.

Figure 6:
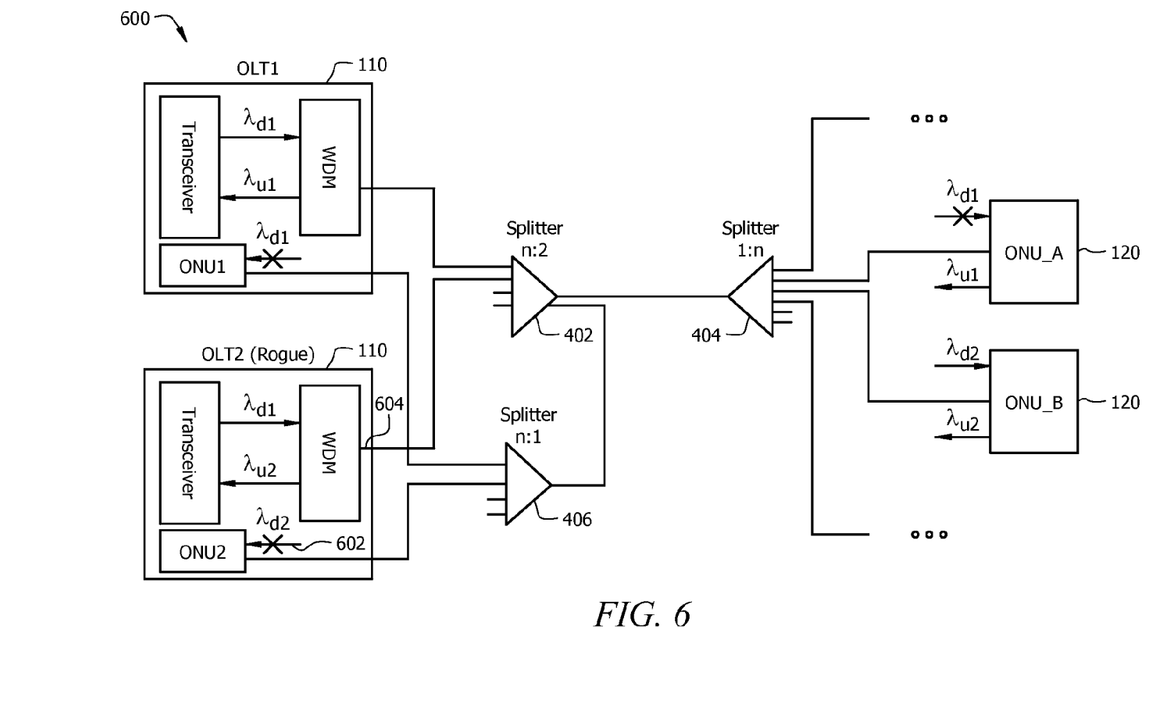
FIG. 6 is a block diagram of a multi-OLT PON system in accordance with an embodiment of the disclosure in which the system is subject to downstream interference.

Refer now to FIG. 6, which illustrates a block diagram of a PON system 600 subject to downstream contamination. In this example, a malfunctioning OLT 110 (OLT2) transmits on an improper wavelength, here $\lambda_{d1}$ which is assigned to OLT1. Again, contaminated signals are depicted in FIG. 6 with an "X" through them. This improper operation may be detected by the ONUs 302 in both OLTs 110. If signals are transmitted from both OLT1 and OLT2 in $\lambda_{d1}$, they may interfere with each other and correct information may not be delivered in this wavelength. When expected downstream frames cannot be received, ONU1 detects the erroneous behavior.

Further, the ONU 302 in the malfunctioning OLT 110 (ONU2) may also detect the error. As previously described in conjunction with FIG. 4, downstream signals from OLT2 may be looped-back to ONU2 via splitters 402 and 406. ONU2 receives expected downstream frames 602 in $\lambda_{d2}$. If there are no such frames in $\lambda_{d2}$, ONU2 can detect that OLT2 is sending a signal at an incorrect wavelength.

In response, the ONU 302 in the victim OLT 110 (ONU1) may send a message to the offending OLT 110 (OLT2). For example, ONU1 may send a message to OLT2 via an out of band management channel or, alternatively in $\lambda_{u2}$, the upstream wavelength of OLT2. If ONU1 sends the message in $\lambda_{u2}$, ONU1 may join OLT2 (via, e.g. the ODN port 604) before sending the message. Further, as described above, ONU2 may determine that no expected frames have been received and may also notify OLT2 of the improper behavior via an internal connection with OLT2 (not shown in FIG. 6), an out of band management channel, or in $\lambda_2$.

If the message to the offending OLT 110 is sent via a working wavelength, the message may be a field or subfield in the upstream or downstream frame, as appropriate, Transmission Convergence (TC) frame or Ethernet frame, or a PLOAM or MPCP message in the upstream or downstream frame, or an ONT management and Control Interface (OMCI) message. In both upstream and downstream contamination notification, if an out of band management channel is employed, the message to the malfunctioning OLT 110 may be in any format.

Although the inter-OLT communications have been described herein in conjunction with messages pertaining to the mitigation of a malfunctioning OLT, integrated ONUs such as ONUs 302 in FIGS. 3 and 4, may also be used to support any functions which may require inter-OLT communication. An example of such inter-OLT communication is resource assignment for open access. In an open-access PON system, as described above, multiple service providers share network infrastructure. Resource assignment in open-access systems has been provided by including a single independent wavelength server for resource assignment. This wavelength server communicates to all OLTs. In a multi-OLT PON system, such as PON system 300 in FIG. 3 or PON system 400 in FIG. 4, including integrated ONUs 302, the resource assignment mechanism may be implemented in one or more OLTs 110 and communicated to the remaining OLTs 110 in the PON system. All relevant information exchange to support resource assignment may be conducted via the integrated ONUs such as ONUs 302 in FIGS. 3 and 4 using inter-OLT communications described above. It would be readily appreciated by those skilled in the art that such information exchange would fall within the principles of disclosed embodiments.

The principles of inter-OLT communications in accordance with the embodiments of the disclosure are not limited to the aforementioned examples. This may be appreciated by referring to FIGS. 7A and 7B which illustrate flowcharts for inter-OLT communication mechanisms as described in conjunction with FIGS. 3 and 4.

Figure 7A:
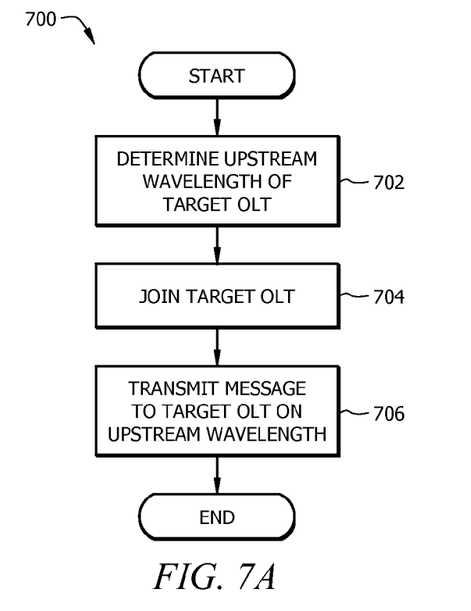
FIG. 7A is a flowchart of an inter-OLT communication process in accordance with an embodiment of the disclosure.

Refer now to FIG. 7A which depicts a flowchart for a process 700 that may be used by an ONU 302 in accordance with an embodiment of FIG. 3 or FIG. 4 to mediate inter-OLT communication in accordance with an embodiment of the disclosure. In block 702, an ONU 302 determines the upstream wavelength of the recipient or target OLT, e.g. the OLT to which it wishes to send a message. The ONU 302 may determine the upstream wavelength by correlating the recipient OLT (e.g. an OLT 110 in FIGS. 3 and 4) with a broadcast bandwidth map, block 702. In block 704, the ONU 302 joins the OLT, and in block 706 transmits its message to the target OLT.

Figure 7B:
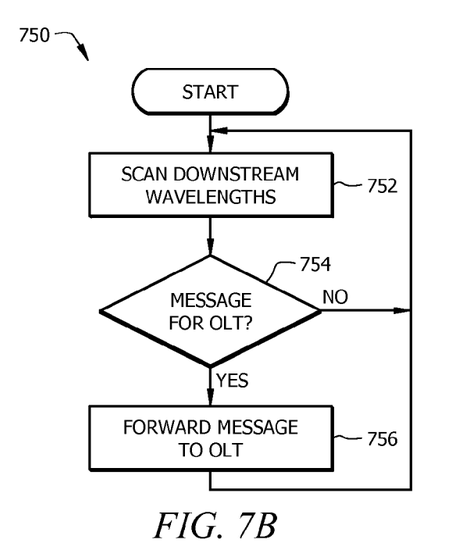
FIG. 7B is a flowchart of an inter-OLT communication process in accordance with another embodiment of the disclosure.

Referring now to FIG. 7B, there is illustrated a flowchart of an alternative mechanism for inter-OLT communication, process 750, that may be used by an ONU 302 in accordance with an embodiment of FIG. 3 or FIG. 4 serving as a communication proxy. In block 752, an ONU 302 with a tunable receiver (not shown in FIG. 7B) scans downstream wavelengths. If a message is received for its OLT 110 (not shown in FIG. 7B), on the scanned wavelength, decision block 754, the ONU forwards the message to the OLT, block 756. The message may be forwarded as previously described in conjunction with FIG. 6. Process 750 returns to block 752 to continue to scan downstream wavelengths. Otherwise, if in block 754, no message is received on the scanned wavelength, process 700 loops to continue scanning the downstream wavelengths.

It would be recognized by those skilled in the art that a message sent to a malfunctioning OLT as described above in conjunction with FIG. 5 may be an application of process 700 in FIG. 7A or, alternatively, process 750 in FIG. 7B. However, it is readily apparent to those skilled in the art that the principles of the disclosed embodiments are not limited by the type or nature of the messages communicated between OLTs.

Figure 8:
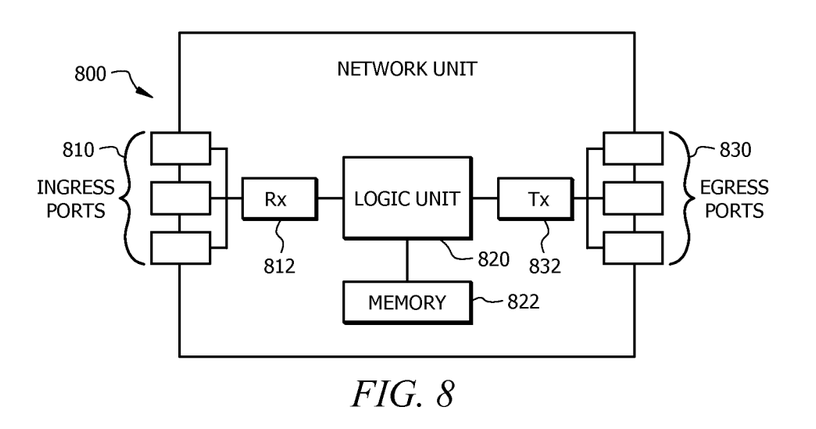
FIG. 8 is a block diagram of an embodiment of a network unit.

At least some of the features/methods described in the disclosure may be implemented in a network apparatus or component, such as a network nodes or units described herein. For instance, the features/methods of the disclosure may be implemented using hardware, firmware, and/or software installed to run on hardware. The network apparatus/component or unit may be any device that transports frames through a network, e.g., an OLT, ONU, etc. FIG. 8 illustrates an embodiment of a transmitter/receiver unit 800, in which the disclosed methods and systems may be implemented. The transmitter/receiver unit 800 may be any device that transports data through the network. The network unit 800 may comprise one or more ingress ports or units 810 coupled to a receiver (Rx) 812 for receiving signals and frames/data from other network components. The network unit 800 may comprise a logic unit 820 to determine to which network components to send data. The logic unit 820 may be implemented using hardware, software, firmware, or combinations thereof. Specifically, the logic unit 820 (e.g. MAC logic described above) may include a processor (which may be referred to as a central processor unit or CPU) that is in communication with memory devices 822, including read only memory (ROM) and/or random access memory (RAM). The logic unit 820 may be implemented as one or more general-purpose CPU chips running software stored in memory 822, or may be part of one or more application specific integrated circuits (ASICs) and/or digital signal processors (DSPs). The network unit 800 may also comprise one or more egress ports or units 830 coupled to a transmitter (Tx) 832 for transmitting signals and frames/data to the other network components. The components of the network unit 800 may be arranged as shown in FIG. 8.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim 1s incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system comprising:
    a first optical line terminal (OLT) comprising:
        a first integrated optical network unit (ONU); and
        a first OLT transceiver;
    a second OLT coupled to the first OLT and comprising:
        a second integrated ONU; and
        a second OLT transceiver; and
    a downstream ONU associated with the second OLT, wherein the first OLT is configured to:
        detect that either the second OLT or the downstream ONU is improperly transmitting at a wavelength not assigned to it; and
        notify the second OLT of the improper transmission.

2. The system of claim 1, wherein the first integrated ONU is configured to communicate with the second OLT via an Optical Distribution Network (ODN) and the second integrated ONU is configured to communicate with the first OLT via the ODN.

3. The system of claim 1, wherein at least one of the first integrated ONU and the second integrated ONU comprises a tunable receiver or a tunable transmitter.

4. The system of claim 3, wherein when the second integrated ONU comprises the tunable receiver, and wherein the tunable receiver is configured to scan downstream wavelengths of the first OLT.

5. The system of claim 1, wherein the first OLT, the second OLT, the first integrated ONU, and the second integrated ONU are configured to transmit and receive data via a management channel.

6. The system of claim 1, wherein the first integrated ONU is configured to:
    correlate a broadcast bandwidth map with the second OLT, and
    join the second OLT using an upstream wavelength of the second OLT indicated in the bandwidth map.

7. The system of claim 1, wherein the first OLT is configured to notify the second OLT of the improper transmission in a warning using an out-of-band management channel.

8. The system of claim 2, wherein the ODN comprises a first splitter and a second splitter, wherein the first splitter has at least two first ports and a second port, wherein one of the first ports is coupled to the first integrated ONU, wherein another of the first ports is coupled to the second integrated ONU, and wherein the second port is coupled to the second splitter.

9. The system of claim 8, wherein the second splitter comprises an array waveguide grating (AWG) portion.

10. The system of claim 8, wherein the second splitter is coupled to the first OLT and the second OLT.

11. The system of claim 8, wherein the first splitter is an n:1 splitter, wherein the second splitter is an n:2 splitter, and wherein n is the number of OLTs in the system.

12. A first optical line terminal (OLT) comprising:
a first optical network unit (ONU);
an optical transceiver; and
at least one processor coupled to the optical transceiver, wherein the processor working in conjunction with the optical transceiver is configured to:
detect that either a second OLT or a downstream ONU associated with the second OLT is improperly transmitting at a transmission wavelength not assigned to it;
determine a second upstream wavelength corresponding to the second OLT;
join, via the first ONU and using the second upstream wavelength, the second OLT; and
notify, via the first ONU and using the second upstream wavelength, the second OLT of the improper transmission.

13. The first OLT of claim 12, wherein the first OLT and the second OLT are peers, and wherein the transmission wavelength and the upstream wavelength are the same.

14. The first OLT of claim 12, wherein the processor is further configured to correlate a broadcast bandwidth map with the second OLT.

15. The first OLT of claim 14, wherein the first OLT is configured to receive the broadcast bandwidth map from a broadcast communication by the second OLT.

16. The first OLT of claim 13, wherein the first OLT is configured to:
join the second OLT; and
receive data from the second OLT using a first upstream wavelength.

17. The first OLT of claim 13, wherein the first OLT is configured to join the second OLT using a protocol that the downstream ONU uses to join the second OLT.

18. The first OLT of claim 12, wherein the first ONU comprises a tunable receiver or a tunable transmitter.

19. A method implemented in a first optical line terminal (OLT), the method comprising:
detecting that either a second OLT or a downstream optical network unit (ONU) associated with the second OLT is improperly transmitting at a transmission wavelength not assigned to it;
determining an upstream wavelength corresponding to the second OLT;
joining, using the upstream wavelength, the second OLT; and
notifying, using the upstream wavelength, the second OLT of the improper transmission.

20. The method of claim 19, wherein the transmission wavelength and the upstream wavelength are the same.

21. The system of claim 1, wherein the wavelength is assigned to at least one of the first OLT, a different OLT, and a different ONU.

22. The first OLT of claim 12, wherein the transmission wavelength is assigned to at least one of the first OLT, a different OLT, and a different ONU.

23. The method of claim 19, wherein the transmission wavelength is assigned to at least one of the first OLT, a different OLT, and a different ONU.

* * * * *